United States Patent [19]
Johnson et al.

[11] Patent Number: 5,208,894
[45] Date of Patent: May 4, 1993

[54] FIBER OPTIC SPLICE CABINET

[75] Inventors: Stephen M. Johnson, St. Paul; Wayne A. Johnson, Rosemount, both of Minn.

[73] Assignee: ADC Telecommunications, Inc., Minneapolis, Minn.

[21] Appl. No.: 552,699

[22] Filed: Jul. 16, 1990

[51] Int. Cl.⁵ .............................................. G02B 6/36
[52] U.S. Cl. .................................................. 385/135
[58] Field of Search .............. 350/96.10, 96.20, 96.21, 350/96.22; 385/135

[56] References Cited

U.S. PATENT DOCUMENTS

| | | | |
|---|---|---|---|
| 4,595,255 | 6/1986 | Bhatt et al. | 350/96.20 |
| 4,630,886 | 12/1986 | Lauriello et al. | 350/96.20 |
| 4,717,231 | 1/1988 | Dewez et al. | 350/96.20 |
| 4,752,110 | 6/1988 | Blanchet et al. | 350/96.20 |
| 4,792,203 | 12/1988 | Nelson et al. | 350/96.20 |
| 4,824,196 | 4/1989 | Bylander | 350/96.20 |
| 4,900,123 | 2/1990 | Barlow et al. | 350/96.20 |
| 4,995,688 | 2/1991 | Anton et al. | 350/96.10 |
| 5,013,121 | 5/1991 | Anton et al. | 385/135 |
| 5,071,211 | 12/1991 | Debortoli et al. | 385/135 X |
| 5,071,220 | 12/1991 | Ruello et al. | 385/135 |

OTHER PUBLICATIONS

ADC brochure dated Sep., 1989 entitled "Fiber Optic Enclosure".
Brochure by Siecor Company entitled "Fiber Distribution Center Family" (no date).
Page from a publication entitled "MFDF Brand-Rex Interconnection Hardware" (no date).

*Primary Examiner*—Akm E. Ullah
*Attorney, Agent, or Firm*—Merchant, Gould, Smith, Edell, Welter & Schmidt

[57] ABSTRACT

A fiber optic enclosure cabinet is disclosed having a housing with walls defining an interior. An opening is formed through the housing permitting access to the interior. An access panel is sized to cover the opening and secure it to the housing to selectively cover and expose the opening at an option of an operator. A plurality of platters are disposed within the interior and slidably mounted to extend through the access opening and be completely returned to the interior at an option of an operator. Each of the platters carries an optical fiber splice tray and an optical fiber take-up spool.

3 Claims, 4 Drawing Sheets

FIBER OPTIC SPLICE CABINET

BACKGROUND OF THE INVENTION

1. Field of the Invention

This invention pertains to the telecommunications and data transmission industries which use optical fibers for transmitting data, voice or other signals. More particularly, this invention pertains to a cabinet for use in retaining and arranging splice locations of optical fibers.

2. Description of the Prior Art

The telecommunications and data transmission industries have seen a tremendous growth in the use of optical fibers for carrying signals. From time to time, it is necessary to splice optical fibers. In the prior art, communication companies have utilized underground splice vaults for splicing optical fibers. As optical fiber markets have grown, communication companies have looked for alternatives to underground splice vaults. An example of an alternative is shown in the brochure of the assignee of the present invention entitled "Fiber Optic Enclosure" dated September 1989. That brochure shows an above-ground fiber optic enclosure which is weather and tamper resistant.

Experience in the industry has resulted in the need for an improved design of above-ground fiber optic enclosures. Specifically, it is desirable to design such an enclosure which has improved organization and access to individual splice locations. It is an object of the present invention to provide such an improved enclosure.

SUMMARY OF THE INVENTION

According to a preferred embodiment of the present invention a fiber optic enclosure cabinet is provided. The cabinet has a housing with walls defining a housing interior. At least one of the walls has an access opening formed through the wall. An access panel is provided and sized to cover the access opening. The panel is secured to the housing to selectively cover and expose the access opening at the option of an operator. A plurality of platters are disposed within the interior and are slidably mounted to extend through the access opening and completely return to the interior at an option of the operator. Each of the platters has disposed on it an optical fiber splice tray and an optical fiber take-up spool. The spool is selected for optic fiber to be wound around the spool at a radius of bending less than a known minimum radius which would damage the optical fiber.

DESCRIPTION OF THE PREFERRED EMBODIMENT

Figure 1:
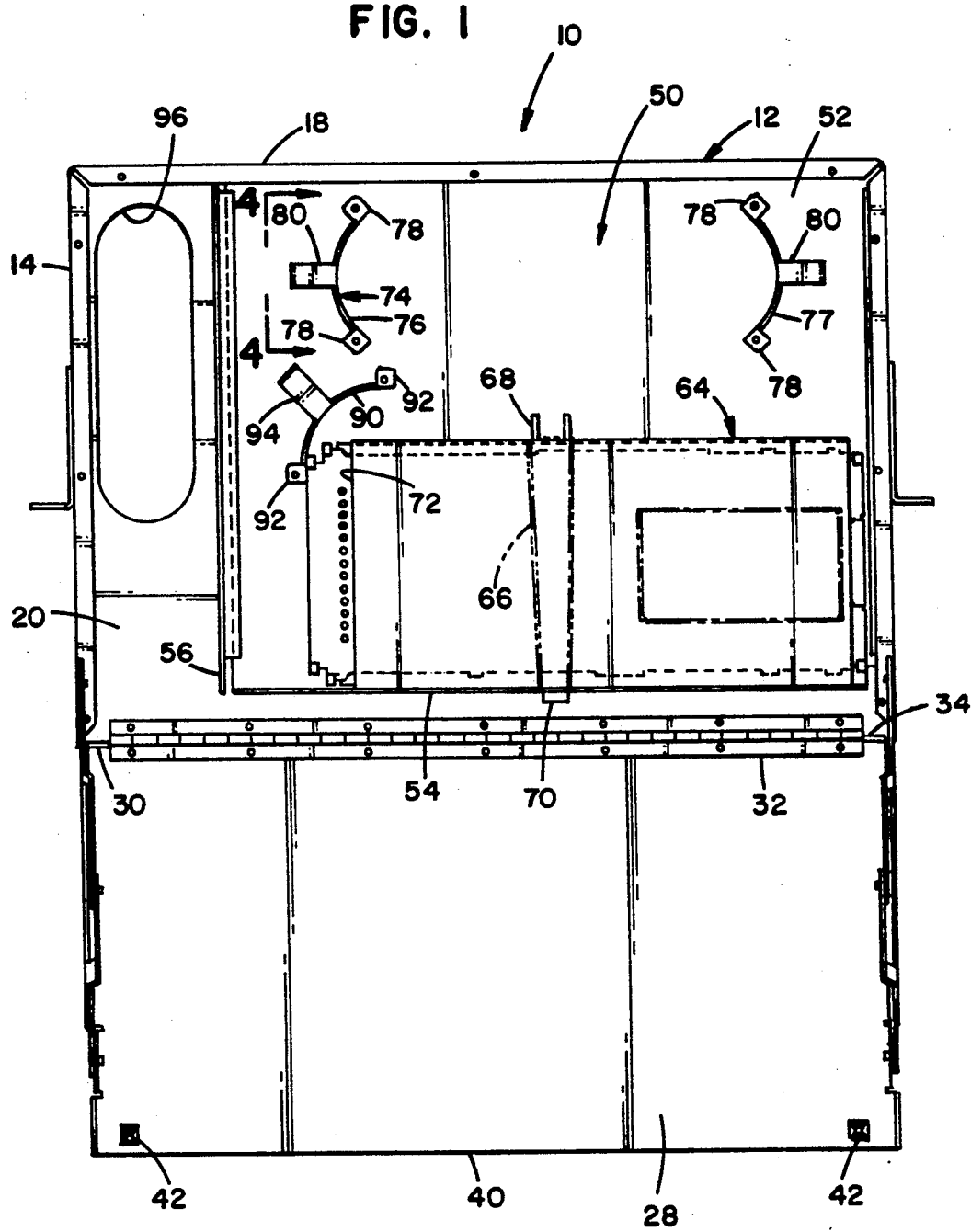
FIG. 1 is a top plan view of a cabinet according to the present invention with a top wall removed and with an access panel shown in an open position.

Referring now to the several drawing figures in which identical elements are numbered identically throughout, a description of the preferred embodiment of the present invention will now be given. A fiber optic enclosure cabinet 10 includes a housing 12. The housing 12 includes spaced apart side walls 14,16, rear wall 18, bottom wall 20, and top wall 22.

Figure 2:
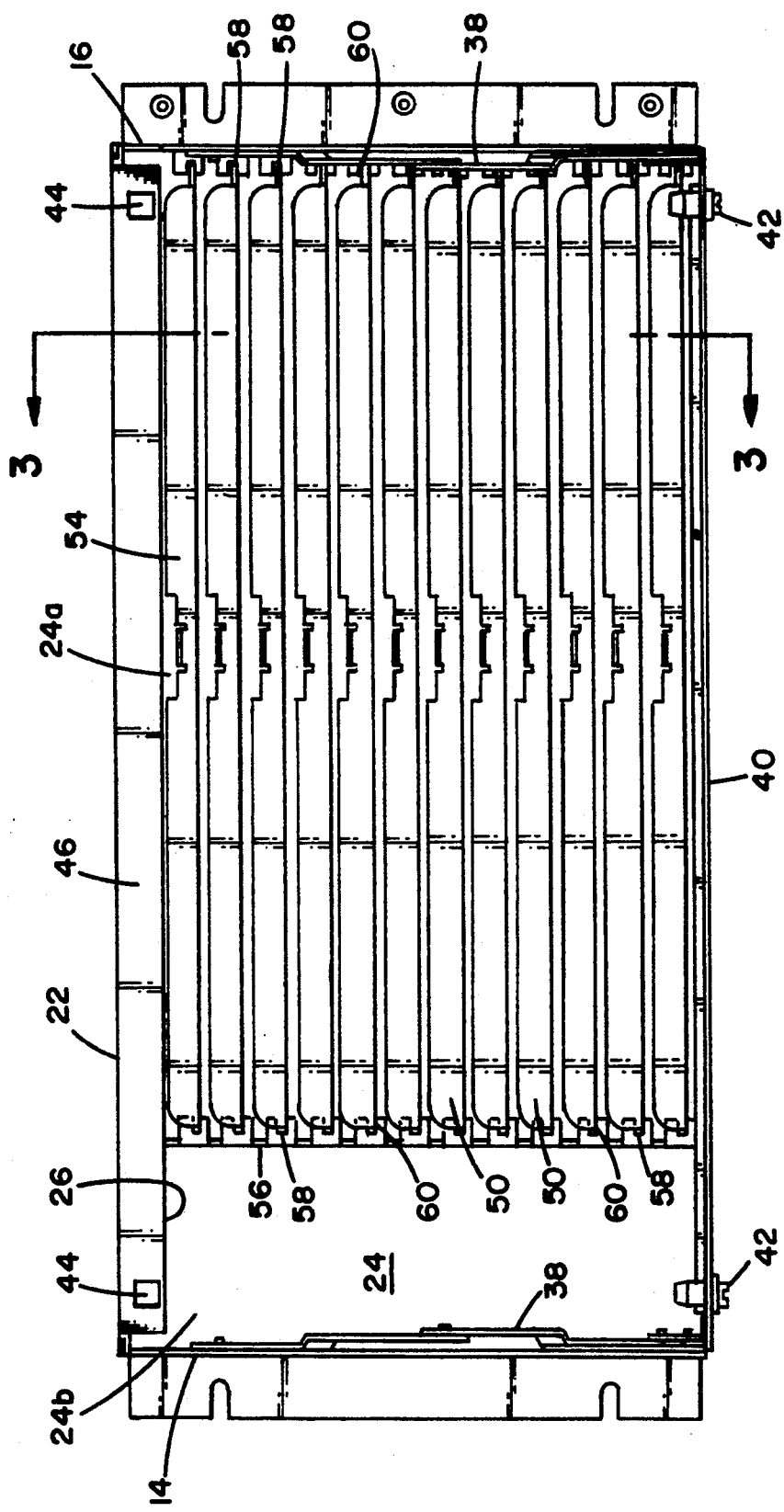
FIG. 2 is a front elevational view of a cabinet according to the present invention with an access panel shown in an open position.

In FIG. 1, top wall 22 is removed to expose the interior 24 of the housing 12. The front wall of the housing 12 is an access opening 26 (see FIG. 2) which permits communication between the interior 24 and an exterior of the housing 12.

An access panel 28 is provided. The panel 28 is sized to cover access opening 26. A lower edge 30 of access panel 28 is connected through a hinge 32 to a leading edge 34 of bottom wall 20. Accordingly, panel 28 can be raised and lowered between a closed position (not shown) with panel 28 covering access opening 26 and an open position as shown in the drawings.

Figure 3:
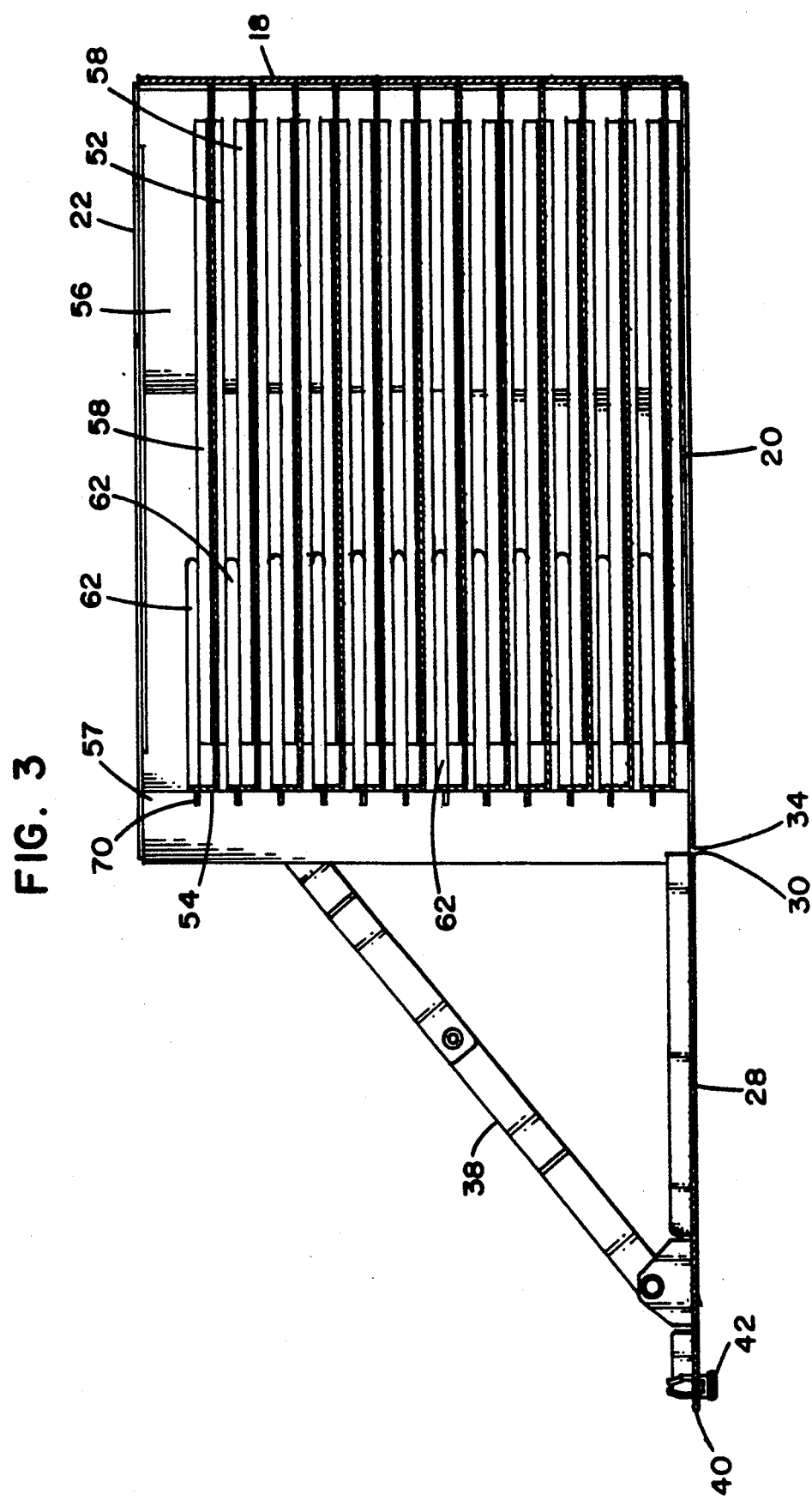
FIG. 3 is a view taken along line 3—3 of FIG. 2.
Figure 4:
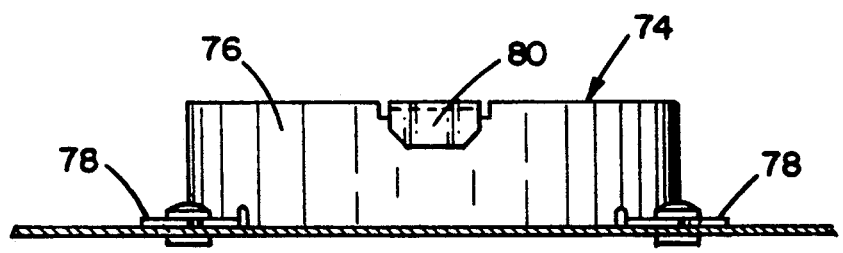
FIG. 4 is a view taken along line 4—4 in FIG. 1.

As shown in the drawings, in the open position the panel 28 is generally coplanar with bottom wall 20. Hinged braces 38 connect panel 28 to side walls 14,16 to retain panel 28 in a rigid open position as shown in FIG. 3. Accordingly, panel 28 can be used as a work surface by an operator.

An upper edge 40 of panel 28 is provided with plastic clips 42 which are sized to be received within openings 44 formed in an edge 46 projecting into access opening 26 off of top wall 22. The plastic clips 42 releasably secure the access opening 28 in a closed position.

An interior wall 56 extends between top wall 22 and bottom wall 20. Interior wall 56 is spaced between side walls 14 and 16 and generally parallel thereto. Interior wall 56 divides chamber 24 into a platter containment area 24a and a cable area 24b (see FIG. 2).

A plurality of platters 50 are provided. Each of platters 50 is identical and a description of one will suffice as a description of all such platters.

Each platter 50 includes a flat bottom plate 52 and an upwardly projecting forward flange plate 54 at the leading edge of the bottom plate 52. Opposing surfaces of interior wall 56 and side wall 16 are provided with parallel aligned guide rails 58. Each of guide rails 58 has a slot 60 formed through the length of the guard rail 58. The slots 60 are aligned in horizontal parallel pairs and sized for each of opposing pairs of slots 60 to slidably receive the side edges of a bottom plate 52 of a platter 50. Accordingly, the platters 50 are arranged in a column with each platter stacked above an adjacent platter and with the platters' side edges slidably received within slot 60. Accordingly, each platter may be independently slid in and out of the interior 24 when the access panel 28 is in the open position.

In the drawings, twelve platters 50 are shown. It will be appreciated that a greater or lesser number could be provided and still be within the scope of the invention.

Shown best in FIG. 3, intermediate wall 56 includes a plurality of slots 62 formed through intermediate wall 56 adjacent a leading edge 57 of wall 56. The slots 62 are positioned above the rails 58.

With best reference to FIG. 1, the upper surface of the platter 50 carries a splice tray 64 disposed adjacent flange 54. Splice tray 64 may be any one of several commercially available splice trays used for splicing and retaining optical fibers. Splice tray 64 has a predetermined entrance side 72 which opposes wall 56 when tray 64 is in its aligned position.

Tray 64 is held in place on platter 50 by an elastic band 66 extending from a rear clip 68 to a forward tab 70. Tab 70 can also act as a location to be grasped by an operator when sliding a platter.

In addition to carrying tray 64, platter 50 carries a take-up spool 74. Take-up spool 74 includes first and second spaced arcuate members 76,78 which are secured to plate 52 by fastening screws or other fastening means received through attachment plates 78 which lay on surface 52. Each of arcuate members 76,77 also includes an upper projecting tab 80 which acts as an upper retaining limit for an optical fiber wound around spool halves 76,77. Members 76,77 are selected to have a radius of curvature less than 1½". This dimension is selected since bending optical fibers at a sharper radius could result in damage to the fiber.

The members 76,77 are spaced apart and opposing one another with their concave surfaces opposing walls 56,16. Accordingly, arcuate members 76,77 cooperate to define a spool 74 around which optical fiber may be wound. An additional arcuate member 90 is provided having attachment tabs 92 received on surface 52 and having an upper tab 94. Member 90 acts as a guideway between spools 64 and entrance 72 of tray 64. Arcuate member 90 is also selected to have a bend radius of less than 1½".

Shown in FIG. 1, bottom wall 20 is provided with an opening 96 sized to receive a bundle of optical fibers. Also, upper wall 22 is provided with an opening (not shown) which is the same size as opening 96 and positioned directly above opening 96. As a result, optical fiber bundles can be passed into area 24b with individually select fibers passed from the bundle through side slots 62 (FIG. 3). Excess amount of the optical fiber may be wound around spools 74 and guided by guide 90 from spool 74 into the splice tray 64.

With the construction and operation thus described, the side slots 62 act as a fanning mechanism for organizing and separating various optical fibers which are passed into separate platters 50. This results in enhanced cable management. Also, each splice tray 64 is now organized independent of all other splice trays within the cabinet 10. Accordingly, an operator can slide out a particular platter and work on a particular splice tray without interrupting any other splice tray in the cabinet. Also, with the structure thus described, various cabinets 10 can be stacked upon one another and cables can be passed through contiguous cabinets or terminated within a given cabin as desired. This adds enhanced flexibility to the design of the present invention over prior art designs.

Having described the present invention with reference to a preferred embodiment, it will be appreciated how the objects of the present invention have been obtained. However, modifications and equivalents of the disclosed concepts are intended to be included in the scope of protection.

What is claimed is:

1. A fiber optic enclosure cabinet comprising:
    a housing having walls defining an interior; an access opening formed through said housing and exposing said interior;
    an access panel sized to cover said access opening and secured to said housing to selectively cover and expose said access opening at an option of an operator;
    a plurality of discrete individual platters disposed within said interior and each of said platters mounted to be extendable independent of others of said platters with said individual platters extendable through said access opening and completely returned to said interior at an option of an operator;
    each of said platters having disposed thereon an optical fiber splice tray and an optical fiber take-up spool;
    said platters are disposed in a vertical column within said interior and separated by a dividing wall from an optical cable chamber, said dividing wall having a plurality of openings formed therethrough each aligned to direct an optical fiber from said chamber to a spool of a platter;
    said housing has upper and lower walls each provided with a bundle opening formed in each of said upper and lower walls and in communication with said chamber and with said housing configured for a plurality of cabinets of similar housing to be stacked upon one another with a lower wall opening of a cabinet in communication with an upper wall opening of a contiguous cabinet, said bundle openings sized to pass a bundle of fibers into said chamber.

2. A cabinet according to claim 1 wherein said spool is selected for optical fibers to be wound around said spool with a radius greater than a radius which would result in damage to an optical fiber.

3. A cabinet according to claim 1 comprising a guide member for guiding fiber from said spool to said splice tray while retaining said guided fiber at a bending radius greater than a minimum bending radius.

* * * * *